US006692347B1

(12) United States Patent
Schneider (10) Patent No.: US 6,692,347 B1
(45) Date of Patent: Feb. 17, 2004

(54) FILTER HOUSING ASSEMBLY FOR TRANSPORTATION VEHICLES

(75) Inventor: Dean Jeffrey Schneider, Washington, MI (US)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 10/256,625

(22) Filed: Sep. 27, 2002

(51) Int. Cl.⁷ .................................................. B60H 3/06
(52) U.S. Cl. ........................... 454/158; 55/323; 55/493; 55/507
(58) Field of Search ................................ 454/143, 158; 55/323, 385.2, 421, 493, 502, 505, 507

(56) References Cited

U.S. PATENT DOCUMENTS

| | | | |
|---|---|---|---|
| 4,319,519 A | * | 3/1982 | Parsson .................... 454/158 |
| 4,463,870 A | | 8/1984 | Coburn, Jr. et al. |
| 4,813,690 A | | 3/1989 | Coburn, Jr. |
| 4,901,395 A | | 2/1990 | Semrau |
| 4,946,737 A | | 8/1990 | Lindeman et al. |
| 5,040,803 A | | 8/1991 | Cieslik et al. |
| 5,072,952 A | | 12/1991 | Irrgeher et al. |
| 5,102,188 A | | 4/1992 | Yamane |
| 5,358,397 A | | 10/1994 | Ligon et al. |
| 5,382,397 A | | 1/1995 | Turner, Jr. |
| 5,506,025 A | | 4/1996 | Otto et al. |
| 5,540,617 A | * | 7/1996 | Siegel et al. ................ 454/158 |
| 5,603,476 A | * | 2/1997 | Merk et al. ............. 248/309.1 |
| 5,795,361 A | | 8/1998 | Lanier, Jr. et al. |
| 5,902,364 A | | 5/1999 | Tokar et al. |
| 6,006,484 A | | 12/1999 | Geissbuhler |
| 6,033,300 A | | 3/2000 | Schneider |
| 6,079,180 A | | 6/2000 | Wycech |
| 6,103,341 A | | 8/2000 | Barz et al. |
| 6,110,245 A | * | 8/2000 | Schlag et al. .............. 55/385.6 |
| 6,126,708 A | | 10/2000 | Mack et al. |
| 6,131,897 A | | 10/2000 | Barz et al. |
| 6,146,565 A | | 11/2000 | Keller |
| 6,149,227 A | | 11/2000 | Wycech |
| 6,171,354 B1 | | 1/2001 | Johnson |
| 6,174,343 B1 | * | 1/2001 | Bloomer .................... 55/385.3 |
| 6,196,621 B1 | | 3/2001 | VanAssche et al. |
| 6,217,439 B1 | * | 4/2001 | Janeling et al. ............. 454/158 |
| 6,237,304 B1 | | 5/2001 | Wycech |

(List continued on next page.)

FOREIGN PATENT DOCUMENTS

| | | |
|---|---|---|
| GB | 628863 | 9/1949 |
| WO | WO 00/03894 | 1/2000 |
| WO | WO 00/55444 | 9/2000 |
| WO | WO 01/54936 | 8/2001 |
| WO | WO 01/71225 | 9/2001 |
| WO | WO 01/83206 | 11/2001 |
| WO | WO 01/88033 | 11/2001 |

OTHER PUBLICATIONS

Copending Application Ser. No. 10/233,919 filed Sep. 3, 2002.
Copending Application Ser. No. 09/631,211 filed Aug. 3, 2000.

(List continued on next page.)

Primary Examiner—Harold Joyce
(74) Attorney, Agent, or Firm—Dobrusin & Thennisch PC (57) ABSTRACT

A filter housing assembly which inhibits the ingestion of foreign matter and particulates into the air intake and air flow openings of a motor vehicle to safeguard the interior cabin and HVAC equipment typically utilized in vehicles. The filter housing assembly of the present invention consists of a filter housing member adapted to house a filter which may be integrated within the assembly as an integral manufactured component in sealable engagement or a snap-fit, modular engageable assembly which allows the selected filter to be removed and replaced at will to ensure that the air intake portions of the vehicle or free from debris and unwanted foreign matter.

21 Claims, 5 Drawing Sheets

U.S. PATENT DOCUMENTS

| | | |
|---|---|---|
| 6,245,126 B1 | 6/2001 | Feldman et al. |
| 6,281,260 B1 | 8/2001 | Hanley, IV et al. |
| 6,296,298 B1 | 10/2001 | Barz |
| 6,311,452 B1 | 11/2001 | Barz et al. |
| 6,368,438 B1 | 4/2002 | Chang et al. |
| 6,375,700 B1 | 4/2002 | Jaroszczyk et al. |
| D457,120 S | 5/2002 | Broccardo et al. |
| 6,382,635 B1 | 5/2002 | Fitzgerald |
| 6,383,610 B1 | 5/2002 | Barz et al. |
| 6,413,611 B1 | 7/2002 | Roberts et al. |
| 6,419,729 B1 | 7/2002 | Duffy et al. |
| 6,589,307 B2 * | 7/2003 | Jaramillo et al. .......... 55/385.3 |
| 2002/0074827 A1 | 6/2002 | Fitzgerald et al. |

OTHER PUBLICATIONS

Copending Application Ser. No. 10/217,991 filed filed Aug. 13, 2002.
Copending Application Ser. No. 10/218,824 filed Aug. 14, 2002.
Copending Application Ser. No. 09/459,756 filed Dec. 10, 1999.
Copending Application Ser. No. 09/676,725 filed Sep. 29, 2000.
Copending Application Ser. No. 60/413,493 filed Sep. 25, 2002.
Copending Application Ser. No. 60/409,625 filed Sep. 10, 2002.
Copending Application Ser. No. 10/236,315 filed Sep. 6, 2002.
Copending Application Ser. No. 09/974,017 filed Oct. 10, 2001.
Copending Application Ser. No. 10/234,902 filed Sep. 4, 2002.
Copending Application Ser. No. 09/939,152 filed Aug. 24, 2001.
Copending Application Ser. No. 10/163,894 filed Jun. 4, 2002.
Copending Application Ser. No. 09/859,126 filed May 16, 2001.
Copending Application Ser. No. 09/858,939 filed May 16, 2001.
Copending Application Ser. No. 60/369,001 filed Apr. 1, 2002.
Copending Application Ser. No. 60/373,241 filed Apr. 17, 2002.
Copending Application Ser. No. 10/133,898 filed Apr. 26, 2002.
Copending Application Ser. No. 60/377,126 filed Apr. 30, 2002.
Copending Application Ser. No. 10/008,505 filed Nov. 8, 2001.
Copending Application Ser. No. 10/008,194 filed Nov. 8, 2001.
Copending Application Ser. No. 60/398,257 filed Jul. 24, 2002.
Copending Application Ser. No. 60/398,411 filed Jul. 25, 2002.
Copending Application Ser. No. 60/399,742 filed Jul. 30, 2002.
Copending Application Ser. No. 60/399,223 filed Jul. 29, 2002.
Copending Application Ser. No. 10/236,315 filed Sep. 6, 2002.
Copending Application Ser. No. 60/333,273 filed Nov. 14, 2001.
Copending Application Ser. No. 60/401,616 filed Aug. 6, 2002.
Copending Application Ser. No. 10/098,952 filed Mar. 15, 2002.
Copending European Application Ser. No. 0211268.8 filed May 17, 2002.
Copending European Application Ser. No. 0211287.8 filed May 17, 2002.
Copending European Application Ser. No. 0220945.0 filed Sep. 10, 2002.
Copending European Application Ser. No. 0130439.3 filed Dec. 20, 2001.
Copending Application Ser. No. 10/337,446 filed Jan. 7, 2003.
Copending Application Ser. No. 10/339,112 filed Jan. 9, 2003.
Copending Application Ser. No. (To Be Assigned) filed Jan. 14, 2003.

* cited by examiner

_Fig-6a_

_Fig-6c_

_Fig-6b_

FILTER HOUSING ASSEMBLY FOR TRANSPORTATION VEHICLES

FIELD OF THE INVENTION

The present invention relates generally to an assembly and device to assist and facilitate the proper operation of various openings or intake ports found in automotive, aerospace, or marine vehicles. More particularly, the present invention provides a filter housing assembly for use in transportation vehicles that reduces and prevents foreign matter ingestion and inhibits air flow into portions of an automotive vehicle.

BACKGROUND OF THE INVENTION

Transportation and passenger carrying vehicles, such as automotive vehicles, rail vehicles, marine vehicles, and aircraft incorporate a number of openings, ports, or intake areas for the intake, circulation, recirculation, and/or ventilation of ambient, outside, or climate controlled air. Many of these vehicles incorporate and utilize heating, cooling, other ventilation systems or devices to regulate and/or control temperature and other air flow properties of the interior or cabin of the vehicle. Additionally, many automotive vehicles come equipped with an air-conditioning system or other form of outside ventilation system, which are well known in the art. To facilitate the environmental, health, safety, and comfort of the vehicle occupants, air is typically channeled into the vehicle interior from the outside atmosphere or otherwise recirculated within the vehicle cabin. Several technical challenges are presented in channeling the outside or ambient air into the vehicle. First, the air intake should be located in an area of the vehicle such that it cannot inadvertently channel fumes, residue, or other post-combustion gas, matter, or particulates from the engine compartment into the cabin. Second, the air intake should be positioned in a location such that snow, precipitation, foreign matter, or road debris does not block or inhibit ingress or egress of the ambient atmosphere. Additionally, the air intake should be protected so that precipitation and/or leaves or other various debris and does not enter into the heating, air-conditioning and ventilation system itself and cause damage to portions of the vehicle.

Most vehicles place the engine in the front portion of the vehicle. Generally speaking, immediately behind the engine compartment is a sealed interior or cabin of the vehicle which is separated from the engine compartment by a fire wall. Adjacent the fire wall and inclined rearwardly from the top of the fire wall is the windshield. Extending forwardly from the base of the windshield and above the fire wall is a generally flat region called the cowling. The cowling is covered by the rear portion of the front hood which also extends across the engine compartment. The lower portion of the hood has a seal molding which seals the engine compartment from the remainder of the cowling. However, the engine hood is spaced away from the windshield allowing air to enter and circulate into the cowling area from behind the front hood. Typically, the air intake for most vehicles is placed in the cowling area since the cowling area is opened to the atmosphere, covered by the front hood but yet sealed away from engine compartment by the molding of the front hood. The cowling typically has a flared opening for the air inlet for the heating, ventilation and air-conditioning system. Air from the air inlet is piped, channeled, or vented into the interior of the vehicle below the dashboard where it is appropriately heated, cooled, vented and/or filtered to meet the environmental comfort, and safety requirements of the vehicle occupants. Although the cowling is covered, it is exposed to the environment whereby precipitation in the form of rain, snow, ice, sleet, or the like as well as unwanted foreign matter may enter the cowling area until it is diverted to the sides away from the cowling. To prevent this unwanted material and matter which accumulates in the cowling area from entering into the inlet for the heating, ventilation and air-conditioning system, an HVAC cover or filter, more commonly referred to as a rainhat, or water dam is used. A typical rainhat found in the prior art includes a tubular-shaped member having a bottom flat flange. The tubular shaped member is inserted over a flared opening of the cowling and can be spot welded thereto. The area of contact of the rainhat flange with the cowling was sealed to prevent the inflow of water. After the tubular shaped member is attached to the flared opening of the cowling, a screen is attached over the tubular shaped member to reduce and prevent the ingestion of leaves or other debris into the heating and ventilation system. The screen is typically weldably attached to an encircling metallic band. The metallic band is either fixed to the tubular shaped member by welding, fasteners or clips. The screen is joined along its sides to the metallic band and typically has a generally flat top end.

Prior art rainhats suffered from a number of drawbacks and manufacturing difficulties. For example, complex manufacturing techniques, the number of separate components utilized, and the associated manufacturing costs are a major disadvantage. The prior art rainhats generally comprise a tubular shaped member, a metal band, three clips and a wire mesh screen. The screen (and encircling metallic band) generally cannot be placed on the tubular shaped member until the tubular shaped member is assembled or otherwise placed within the selected portion of the vehicle since the spot welding guns need to be inserted within the tubular shaped member during the fabrication process. Additionally, it is not uncommon for the spot welds to break or otherwise be uneven or non-uniform. When the spot weld is deficient, a portion of the tubular shaped member or of the flared opening is typically torn resulting in a crack or tear, which can lead to the ingestion of precipitation or other matter into the heating, ventilation and air-conditioning system air intake. To protect the ends of the screen, the screen is generally inserted into the encircling metallic band. This allows a potential gap between the screen and the top end of the encircling metallic band to be created. The above noted gap may allow the entry of leaves or other debris, which can then block or otherwise prevent proper air intake through the opening.

An improvement over prior art rainhats is set forth and disclosed in commonly-assigned U.S. Pat. No. 6,033,300 assigned to L&L Products, Inc. of Romeo, Mich., which is expressly incorporated by reference herein. This patent discloses a rainhat which attaches to the cowling of an automotive vehicle using a flange. The cowling is disposed in position forward the vehicle windshield underneath the hood which covers the vehicle engine compartment. At least a portion of the cowling is a generally planar surface. The generally flat surface portion of the cowling encircles a flared opening. The flared opening receives air for the vehicle heating, ventilation and air conditioning system. The rainhat disclosed in U.S. Pat. No. 6,033,300 is formed from an integral unit of polymeric material by using a high temperature injection molding process which does not require the rainhat to be spot-welded to the cowling, but rather, attaches to the cowling using compliant barbs.

Although the rainhat and technology set forth in commonly-assigned U.S. Pat. No. 6,033,300 works well and is advantageous in many applications, the present invention overcomes the drawbacks of the prior art by providing a filter to prevent unwanted gaseous matter, carbon monoxide, fumes, unwanted odors, or other particulates or debris from entering an interior portion of the vehicle. The filter may also be used in combination with a screen to further prevent ingestion of unwanted materials into the interior portion or cabin of an automotive vehicle. The present invention further provides the freedom and flexibility of a snap-fit filter housing assembly which may be easily opened for replacement of parts, reduced labor savings, and ease of manufacturing operations during assembly and/or part replacement of the vehicle.

SUMMARY OF THE INVENTION

The present invention provides a foreign matter ingestion and air flow control device that aids in preventing foreign or gaseous matter ingestion and inhibition of air flow into portions of an automotive vehicle. In general, the foreign matter ingestion and air flow control device has a filter housing assembly that provides a snap-fit together filter housing member and filter housing cover which can be easily opened to replace a removable filter. More particularly, in a preferred embodiment, the filter housing assembly comprises:

A) a filter housing member adapted to house a filter, the filter housing member having
   i) an upper peripheral wall,
   ii) an intermediary portion, and
   ii) a bottom portion, the bottom portion having
     a) a bottom opening,
     b) a screen, the screen being integrally formed within the bottom opening of the bottom portion therein, and optionally
     c) an air filter;

B) a filter housing cover having
   i) a top planar surface, the top planar surface having a flared opening disposed therein,
   ii) a deflector portion, and
   ii) a ridge portion, wherein the deflector portion and the ridge portion cooperate to deflect and channel matter around the filter housing assembly; and wherein the filter housing member and the filter housing cover are adapted to releasably snap-fit together. In this embodiment, the screen is formed by stamping the screen with the bottom portion. Additionally, a sealant may be provided and utilized for adhesively sealing the assembly to a receptacle in an automotive vehicle. The selected sealant may be an adhesive, a heat activatable sealant or a heat activatable expandable sealant, which undergoes activation during the automotive manufacturing operation, exposure to paint ovens, or other application of a heat energy source.

In an alternative embodiment, a filter housing assembly is provided for preventing foreign matter ingestion and inhibition of air flow into portions of an automotive vehicle, the assembly comprises:

A) a filter housing member adapted to house a filter, the filter housing member having
   i) an upper peripheral wall, the upper peripheral wall having
     a) at least two stop members disposed at an angle to the upper peripheral wall, the two stop member being spaced at two opposite ends of the filter housing member, and
     b) a lower interior planar peripheral edge disposed inwardly at an angle from the upper peripheral wall, the lower interior planar peripheral edge defining an inner perimeter shelf for supporting the air filter,
   ii) an intermediary portion angled and extending downwardly away from the upper peripheral wall,
   iii) a bottom portion having
     a) a screen integrally disposed within the bottom portion,
     b) optionally, a removable air filter,
     c) a bottom opening, the bottom opening having an interior portion for sealably attaching to the screen,
     d) a lower planar surface, the lower planar surface being integrally formed with the intermediary portion and being spaced below the inner perimeter shelf, wherein the bottom opening is disposed within the lower planar surface, and
     e) a lower extended wall extending vertically downwardly from the lower planar surface and surrounding the bottom opening;

B) a filter housing cover having
   i) a top planar surface, the top planar surface having a flared opening disposed therewithin,
   ii) a deflector portion, and
   iii) a ridge portion, wherein the reflector portion and the ridge portion cooperate to deflect and channel matter, such as precipitation or other particulates, around the filter housing assembly, wherein the filter housing member and the filter housing cover are adapted to releasably snap-fit together;

C) means for attaching the assembly to a receptacle member of an automotive vehicle; and D) means for releasably attaching the filter housing member to the filter housing cover. Additionally, a method of use for replacing a removable filter disposed within the housing assembly is provided.

In accordance with the teachings of the present invention, it is desirable to provide a foreign matter ingestion and air flow control device which does not require a single integral unit having a flange to engage a vehicle cowling. It is also desirable to provide a foreign matter ingestion and air flow control device which is easily assembled to provide reduced labor savings and thus is cheaper to manufacture. It is still another desire to provide a foreign matter ingestion and air flow control device having easily replaceable parts that operate to prevent unwanted fumes, odors, or gaseous matter, including unsafe gaseous compounds such as carbon monoxide and other combustion engine residue from entering a vehicle compartment. It is still also desirable to provide a foreign matter ingestion and air flow control device that may be used in the HVAC system and in other portions of the vehicle.

In a particular non-limiting embodiment, the present invention provides a filter housing assembly, which prevents foreign matter ingestion and inhibits targeted air flow into portions of an automotive vehicle having a releasable snap-fit together filter housing member and filter housing cover which can be easily opened to replace a removable filter. The filter housing assembly further has a screen and a filter that cooperate to prevent unwanted materials or particles from entering into an interior portion of an automotive vehicle.

The above-noted objects and other advantages of the present invention will become more apparent to those skilled in the art as the invention is further explained in the accompanying detailed description and drawings.

BRIEF DESCRIPTION OF THE DRAWINGS

FIG. 5a is a plan view of a filter housing member in accordance with the present invention.

FIG. 5b is a side view of the filter housing member of FIG. 4a.

FIG. 6a is a plan view of a filter housing cover in accordance with the present invention.

FIG. 6b is a side view of the filter housing cover of FIG. 5a.

FIG. 6c is an enlarged view taken along section A—A of FIG. 6a.

DETAILED DESCRIPTION OF THE PREFERRED EMBODIMENTS

The present invention provides a foreign matter ingestion and air flow control device that aids in preventing foreign matter, gaseous matter, or particulate matter ingestion and inhibition of air flow into portions of an automotive vehicle. In general, FIGS. 1–6c, generally refer to the foreign matter ingestion and air flow control device having a filter housing assembly that provides a modularly engageable or snap-fit together filter housing member and filter housing cover 94 which can be easily opened to replace a removable filter 18. More particularly, the filter housing assembly 10 comprises a filter housing member 14 having a screen 16 and a filter 18, and a filter housing cover 94. The filter housing member 14 is adapted to releasably mate or modularly engage with the filter housing cover 94 to provide a filter housing assembly 10 for at least one filter or for a plurality of filters. The filters preferably comprise at least two filters comprising the screen 16 and the air-cleaning filter 18. The filter housing member 14 can be stamped with an integrated screen 16 and preferably includes a removable filter 18 which can be cleaned or replaced to achieve the filtration of desired airborne particulates, allergens, or other matter. Alternatively, in another embodiment, the filter 18 may be permanently attached to the filter housing member 14 or may be integrally formed with the screen 16 as an assembly.

The filter housing assembly 10 of the present invention is preferably made from any suitable material that can withstand heat from an automotive e-coat operation. Preferably, the material should not deform at temperatures typically encountered in an automotive manufacturing environment and should pass through such paint ovens without significant distortion or degradation of the chosen material. This will enable the filter housing assembly 10 to pass through the e-coat oven and still maintain its functional integrity and geometric dimensions. In addition, material forming the filter housing assembly 10 preferably should be capable of passing through a phosphate immersion tank without being damaged.

The filter housing assembly 10 may be formed from suitable temperature resistant materials such as expanded metal, metal compounds, metallic foams or their alloys, as well as a precure epoxy material that may be expandable. It is contemplated that the filter housing assembly 10 could comprise a Nylon sold under the trademark Zytel, manufactured by Dupont located in Wilmington, Del., or other polymeric material as set forth in commonly owned U.S. Pat. No. 6,103,341, expressly incorporated by reference herein. The filter housing assembly 10 may also be selected from materials consisting of extruded aluminum, aluminum foam, magnesium, magnesium alloys, molded magnesium alloys, titanium, titanium alloys, molded titanium alloys, polyurethanes, polyurethane composites, low density solid fillers, and formed SMC and BMC, or the like.

The filter housing assembly 10 may be formed by using preformed patterns and may also be formed by stamping, injection molding, reaction injection molding, rotational molding, machining, blow-molding or extruding a sheet (having a flat or contoured surface) and then die cutting the formed sheet in accordance with a predetermined configuration depending upon the selected application and its geometric or contour requirements.

Although the prevention and inhibition of precipitation and other unwanted materials such as leaves, road debris, gaseous matter, particulates, ambient odors, and carbon monoxide are directed for use as a filter housing assembly 10 for a heating, ventilation and air conditioning intake to an automobile, it is contemplated that the present invention can be utilized in other portions of an automotive vehicle that are used to ensure ingress and egress capability of air flow, water, or other unwanted materials to the vehicle such as an air extractor in a door or trunk, or bumper, or other portions of a passenger cabin of an automotive or emergency service vehicle, which are well known in the art.

A heating, ventilation, and air conditioning (HVAC) handling system includes an air inlet. The inlet receives air from outside of the vehicle or recirculated air from inside the occupant compartment of the vehicle to allow the ingress of air to be conditioned into an interior portion of the vehicle. It should be appreciated that, the HVAC may be positioned on either the occupant or passenger compartment side of a dash panel, typically, but not necessarily below an instrument panel (not shown). Also, the HVAC air handling system includes a case (not shown), having a preferred architecture, to package the individual component parts of the HVAC air handling system. The filter housing assembly 10 of the present invention can directly fasten to a receptacle 12 (not shown) located in a structural member of the vehicle such as the HVAC case or a vehicle cowling such that when fastened to the receptacle 12, the filter housing assembly 10 is in communication with the air inlet.

One of skill in the art will also appreciate that the size and specific filter housing assembly will vary depending on the physical dimensions of the receptacle 12 area of the automotive vehicle. The filter housing assembly 10 may be configured in any shape, design, or thickness corresponding to the dimensions of the complementary vehicle receptacle 12 portion of an automobile.

Figure 1:
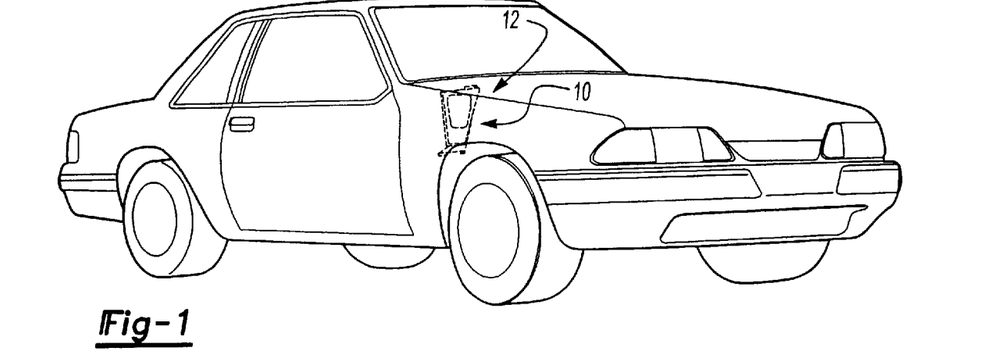
FIG. 1 illustrates the present invention placed within the environment of a receptacle located in a selected structural member of a vehicle.
Figure 2:
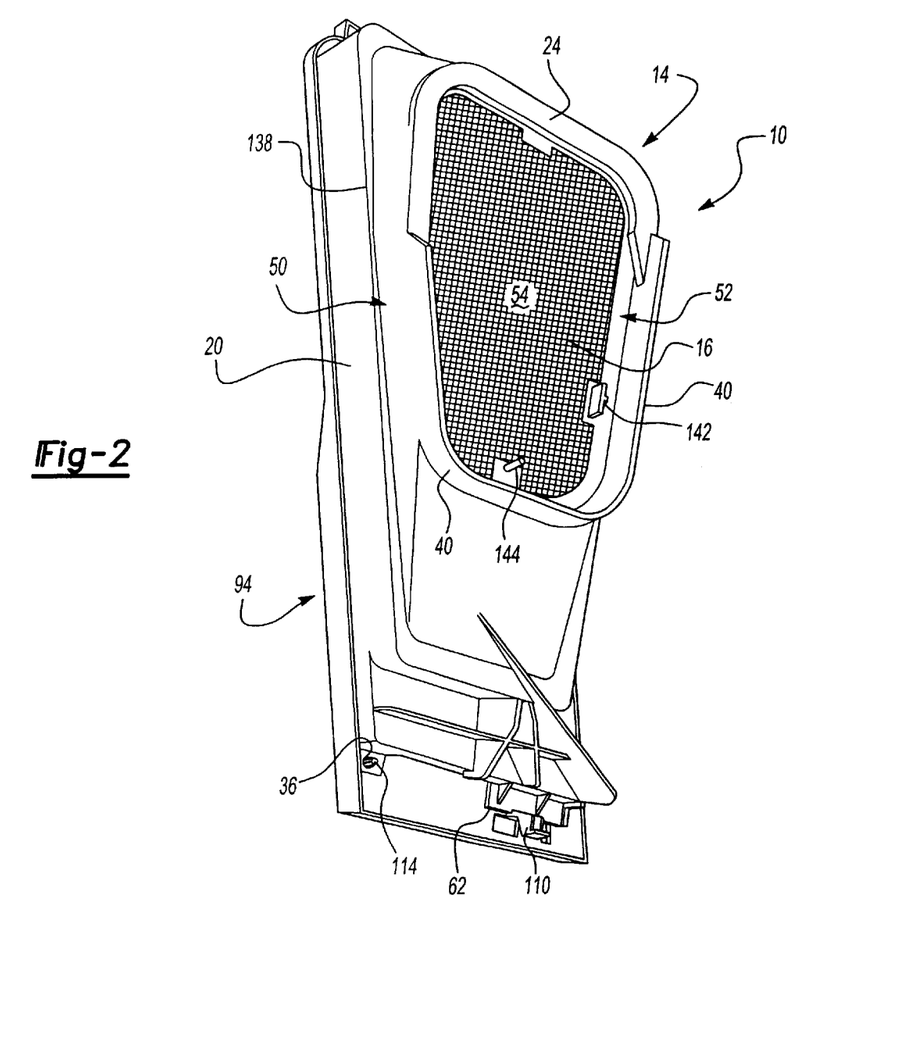
FIG. 2 is a side perspective view of a filter housing assembly in accordance with the present invention.
Figure 3:
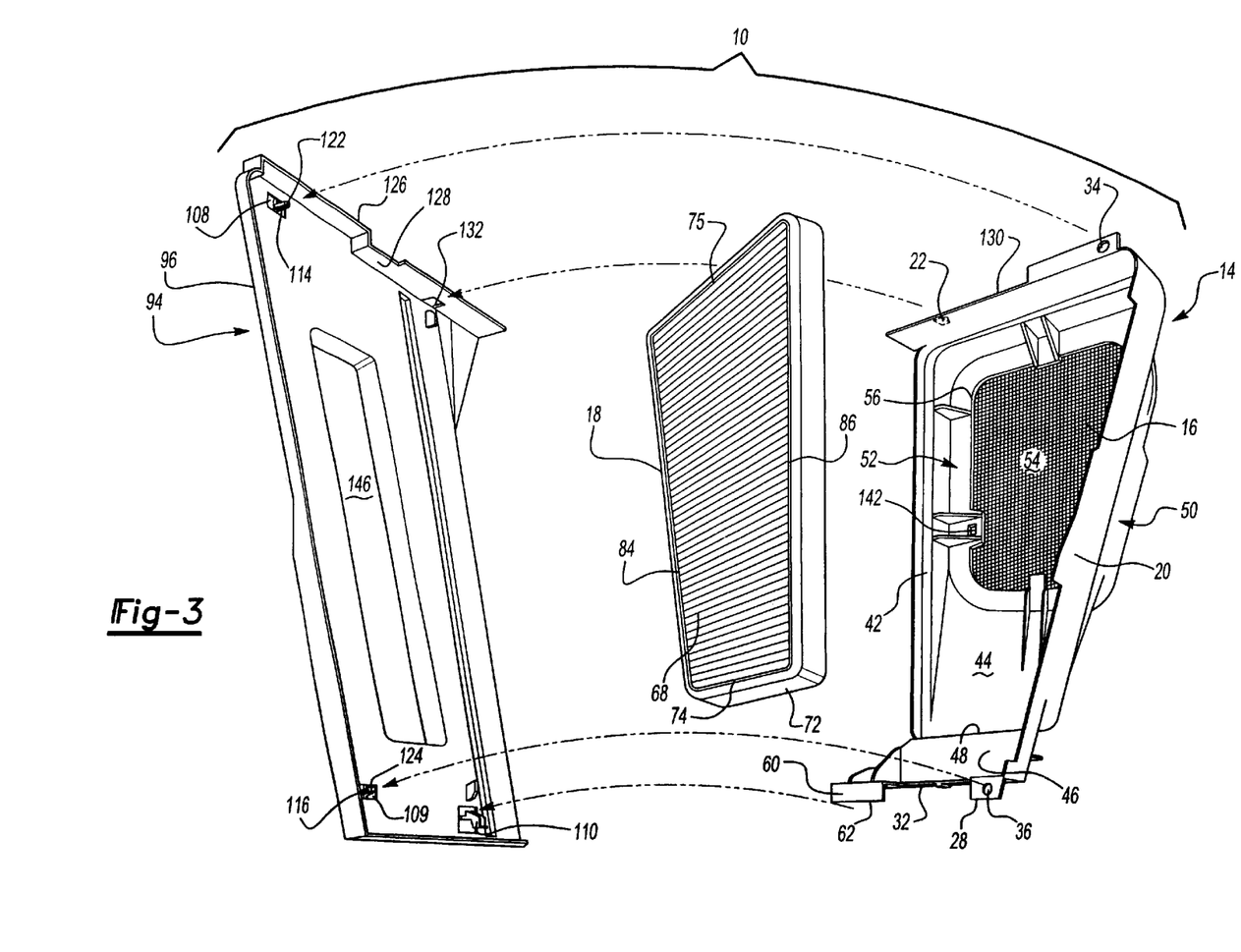
FIG. 3 is an exploded side perspective view of the filter housing assembly of FIG. 2.

Referring to FIGS. 2–3, the filter housing assembly 10 provides the filter housing member 14 having an upper peripheral wall 20, an intermediary portion 50, and a bottom portion 52, the bottom portion 52 having at least two filters, the filters comprising the screen 16 integrally formed therein and an air filter 18, which may either be removable or fixedly attached.

Figures 4A, 4B:
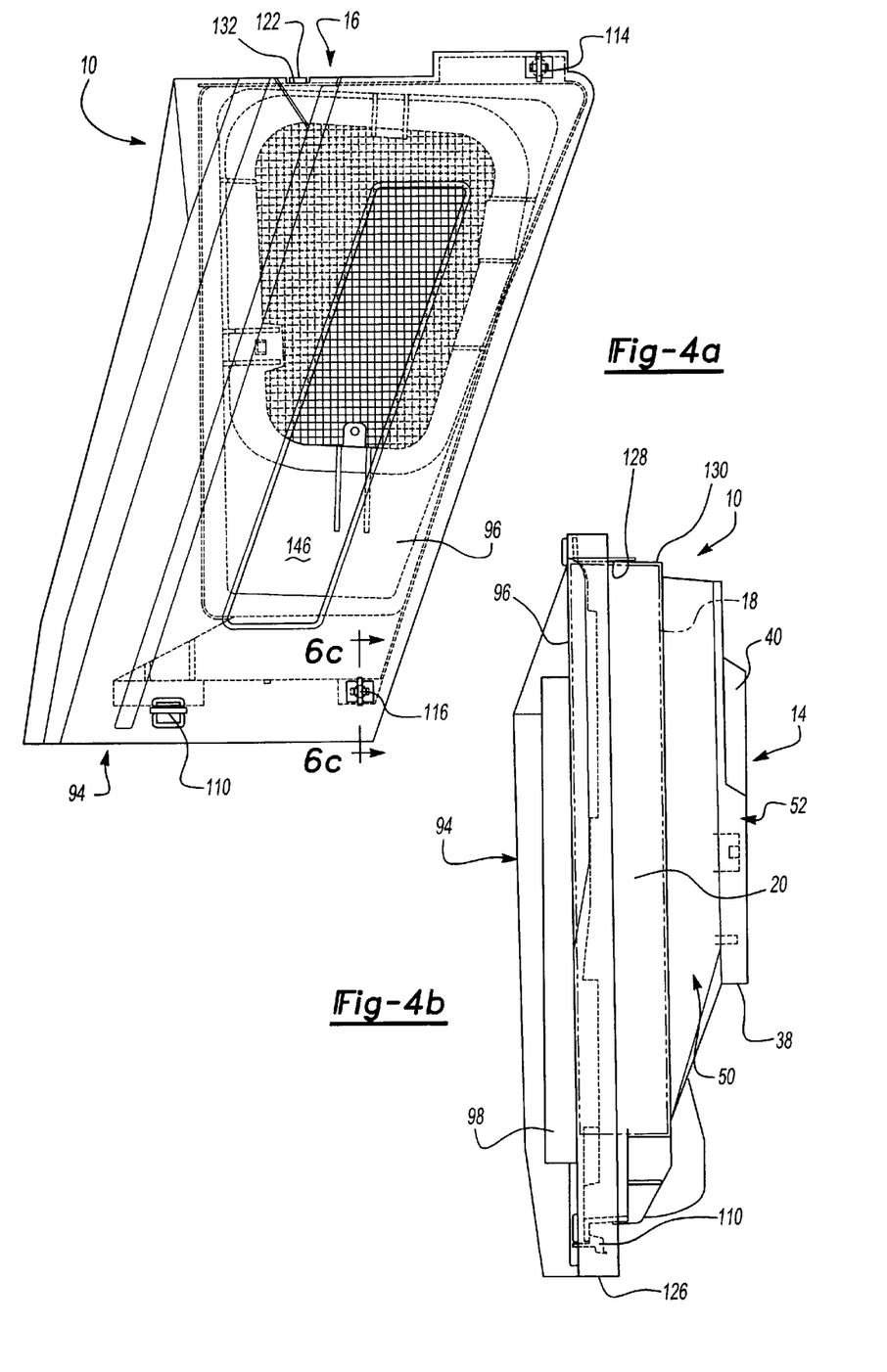
FIG. 4a is a front elevational view of the filter housing assembly of FIG. 2.
FIG. 4b is a side elevational view of the filter housing assembly of FIG. 2.
Figures 5A, 5B:
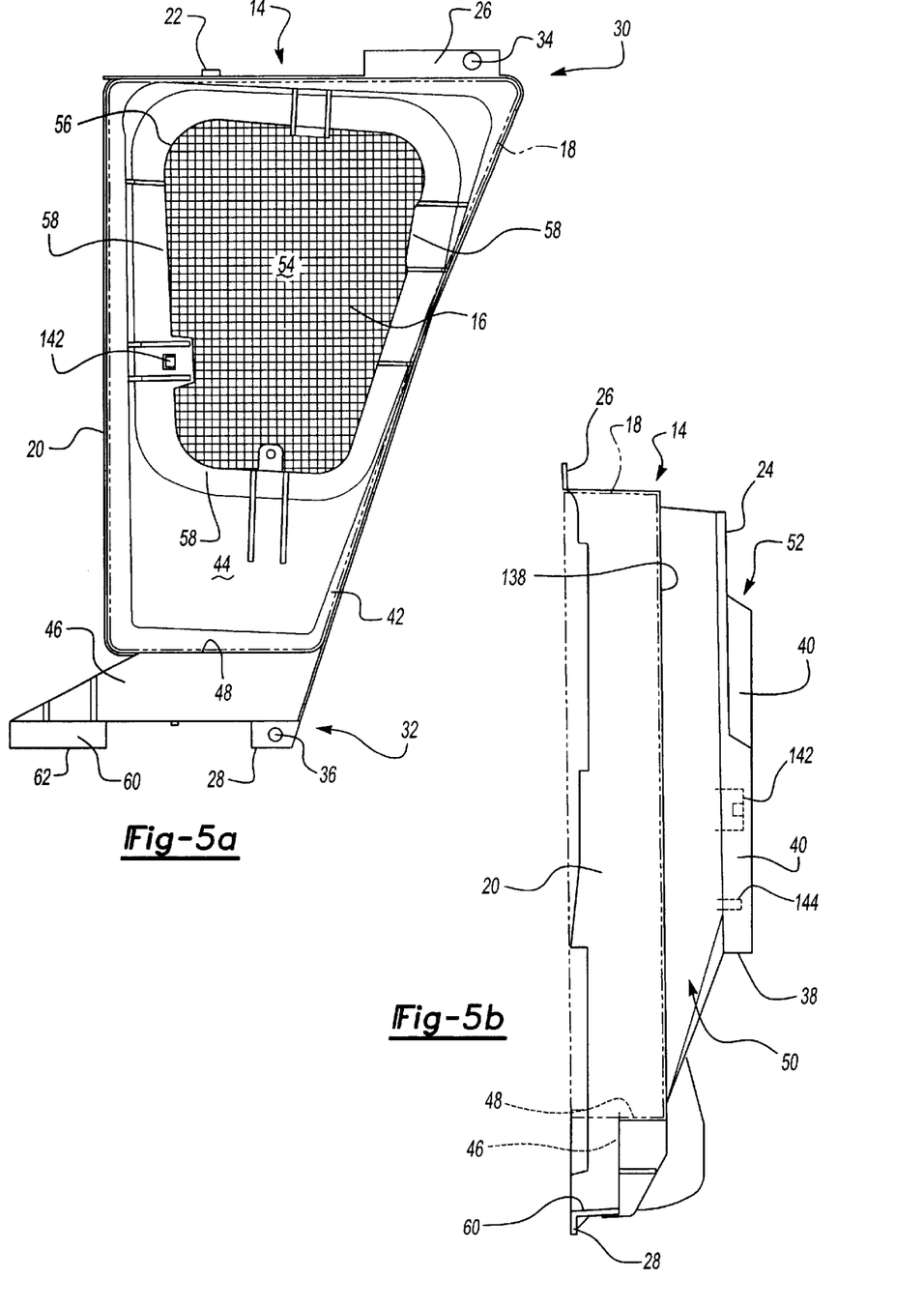

As shown in more detail, referring to FIGS. 4a–b and 5a–b, the upper peripheral wall 20 is releasably joined to the filter housing cover 94. The upper peripheral wall 20 provides a first stop member 26, and a second stop member 28 that are preferably, disposed at about a 90° angle to the upper peripheral wall 20 and are spaced apart at two opposite ends, a first filter housing end 30, and a second filter housing end 32 of the filter housing member 14. Preferably, each stop member 26, 28 has an associated hole 34, 36 disposed therewithin for receiving a fastener member. The upper peripheral wall 20 has a lower interior planar peripheral edge 138 disposed inwardly preferably, at about a 90° angle to the upper peripheral wall 20, the lower interior planar peripheral edge 138 cooperates with the intermediary portion 50 to define an inner perimeter shelf 42 for supporting the filter 18. The shelf is preferably, complementary to outer contours of the filter 18. As shown in FIG. 5a, the upper peripheral wall 20 further provides a protruding portion 22 that protrudes outwardly from an exterior portion of the peripheral wall for releasably engaging a recess in the filter housing cover 94.

More particularly, as shown in FIGS. 5a–b, the filter housing member 14 further provides an end shelf 46, that is preferably, spaced above the inner perimeter shelf 42 at a placement approximately equivalent of the distance between the inner perimeter shelf 42 and stop member 28 such that the filter 18 would be substantially disposed between the filed housing member 14 and the filter housing cover 94, such that the interior planar peripheral edge 138 and a side wall of the end shelf 46 cooperate to define an interior cavity 44 for securing the filter 18 within the filter housing member 14. The end shelf 46 has a flat planar surface 48 for engaging a flange member of the filter 18 to properly seat the filter 18 within the filter housing member 14. The end shelf 46 further has a generally L-shaped extended portion 60 extending outwardly from the flat planar surface 48 of the end shelf 46, the L-shaped extended portion 60 has an upper planar surface 62 that is co-planar with the stop member 28 of the peripheral wall. The L-shaped upper planar surface 62 is designed to releasably snap-fit to a compliant clip that is disposed within and protrudes downwardly from the filter housing cover 94 as described further below.

The filter housing member 14 may optionally provide a filter 18 that is preferably, removable and which can be replaced. The filter 18 may be removably attached to the filter housing assembly or may be integrally attached to the screen 16 of the filter housing member 14. The filter 18 is preferably, made from a pleated porous material capable of preventing carbon monoxide as well as unwanted odors from entering an interior portion of an automotive vehicle. A conventional filter 18 such as the filter disclosed in U.S. Pat. No. 5,944,860 which is herein expressly incorporated by reference could be used in accordance with the present invention. More particularly, a pleated filter 18 used in the present invention may have a plurality of pleated ridges 68 wherein each pleated ridge has a first end and a second end, and wherein each pleated ridge first end slightly overlaps another pleated ridge first end in one direction perpendicular to the pleated ridge, and wherein each pleated ridge second end slightly overlaps another pleated ridge second end in an opposite direction also perpendicular to the pleated ridge, and wherein the folded ends cooperate to form a first semi-rigid peripheral edge, and a second semi-rigid peripheral edge perpendicular to each pleated ridge. A first substantial L-shaped flange member, preferably made from a plastic or other polymeric material is adhesively joined parallel to a first pleated ridge and a second L-shaped flange member is adhesively joined to a last pleated ridge to maintain the filter structural integrity by forming two rigid peripheral edges. It is contemplated that the L-shaped flange may engage the flat planar surface 48 of the filter housing end shelf 46 to properly orient and attach the filter 18 to the filter housing member 14. Still further, the selected filter 18 may comprise additional and specific particulate filtering media or means to address issues of smog, fumes, ambient odors, or other matter which specific drivers or passengers may have allergies or would otherwise be susceptible to for health reasons. For example, in this embodiment, it is contemplated that the present invention could be utilized and incorporated into school buses to filter particulates or matter which adversely impacts children suffering from asthma or smoke from emergency vehicles that need to respond to an emergency situation.

To increase the structural integrity of the filter 18 and to prevent air leakage around the filter 18 when the filter is installed in the filter housing interior cavity 44, an optional gasket 72 may be used, wherein the gasket 72 is adhesively joined to the peripheral edges. Preferably the gasket is formed of a foam rubber material available with an adhesive coating on one surface which can be adhesively joined to the peripheral edges 74, 75, 84, 86.

The filter housing member 14 further provides the filter housing intermediary portion 50 that extends downwardly away from the upper peripheral wall 20. While FIG. 5b shows an angled intermediary portion 50, alternative geometries are possible, such that an alternative intermediary portion may be complementary to the receptacle 12 formed within a structural member of an automotive vehicle. In the present embodiment, the angled intermediary portion 50 is positioned beneath an upper flared opening 54 in the filter housing cover such that air or fluids ingested into the filter housing member 14 first come into contact with the angled intermediary portion 50 and then with the screen 16 disposed within the bottom portion 52 of the filter housing member 14.

FIGS. 5a–b illustrate the filter housing member bottom portion 52 providing a lower planar surface 24 having a bottom opening 54 disposed therein and the screen 16 that is sealably attached to an interior portion 56 of the bottom opening 54. The lower planar surface 24 is integrally formed with the intermediary portion 50 and is spaced below the inner perimeter shelf 42. The bottom opening 54 disposed within the lower planar surface 24 of the filter housing member 14 is in fluid communication with an HVAC inlet and sufficiently provides an ingress for air to flow within portions of the vehicle to meet the needs of the heating, ventilation and air conditioning system of the vehicle.

The screen 16 aids in the prevention of leaves, leaf stems or other debris from entering an air inlet into portions of an automotive vehicle. Preferably, the screen 16 disposed within the bottom opening 54 of the lower planar surface 24 is integrally formed with the bottom opening 54 of the filter housing member 14 for further preventing foreign matter ingestion. The screen 16 is preferably formed within the bottom opening 54 by stamping the screen 16 to the filter housing bottom portion 52. Preferably, the screen 16 is made from galvanized 10 coated copper flashed wire cloth having a mesh size of 12×12 and a 0.01" diameter. Optionally, integrally formed with the screen 16 are at least one clip 142 and a downwardly protruding member 144 adapted to temporarily or permanently attach the filter housing member 14 to the receptacle 12.

The bottom portion 52 further comprises a seal 58 that surrounds the bottom opening 54 and a perimeter of the screen 16. To provide a semi-structural bond to adhesively and sealably join the seal 58 to the bottom portion 52 of the filter housing member 14, the seal 58 is connected therewith an adhesive. The adhesive is preferably, formed from a thermosetting formulated adhesive with a synthetic polymer base which may incorporate magnetizable particles but in general does not. The adhesive preferably, (1) may provide a strong magnetic field; (2) melts at temperatures encountered in automotive paint ovens (between about and 235. degree. C.) in order to flow over and around the bottom portion opening 54 to be sealed; (3) bonds well to the material of the filter housing assembly 10; and (4) partially expands to fill any opening between the seal 58 and the filter housing member bottom portion 52. In addition, the adhesive should pass any specifications determined to be important to the automotive manufacturer that may include, but are not limited to, corrosion resistance, adhesive strength, toxicity, odor control issues, expansion, etc. Most preferably, the adhesive is a hot melt sealant that volumetrically expands to some extent during curing. However, the present invention may also comprise a non-expandable sealant.

In particularly preferred embodiments, as suggested, the material for the seal 58 is formulated to be fuel resistant. In one such embodiment, the material is substantially formulated of an ethylene-based material and includes an ethylene with one or more copolymers. Preferably, the ethylene-based material includes up to or at least 60 percent by weight or greater ethylene, more preferably at least 70 percent by weight ethylene and even more preferably at least 80 percent by weight ethylene. Exemplary copolymers or comonomers of the material include, but are not limited to methyl acrylate, vinyl acetate or the like. The copolymer or comonomer of the ethylene-base material may represent up to, or greater than about 40% by weight of the material, but is more preferably no greater than 30% by weight of the material, even more preferably no greater than 20% by weight of the material and still more preferably no greater than 10% by weight of the material. Advantageously, such materials tend to have relatively greater crystallinity, which without being bound by any theory, assists in forming materials that are more fuel resistant.

In other embodiments, the material for the seal 58 is formulated with other polymers or elastomers that tend to exhibit fuel resistance. In one preferred embodiment, such materials are epoxy-based polymers. In other preferred embodiments, such materials are elastomeric materials such as nitrile butadienes.

The adhesive includes as one component a synthetic polymer resin or a blend of resins and preferably includes one or more elastomers. In one embodiment, where magnetic particles are, the adhesive contains a polyolefin resin, a combination of ethylene vinyl acetate copolymer (EVA) and an acrylic resin such as ethylene methyl acrylate.

A cross-linking or curing agent is also preferably included in the adhesive to cross-link the polyolefin. The cross-linking agent should provide a reasonable shelf life, but should also be fully activated at the temperatures encountered in the curing environment of an automotive paint oven. A tackifier component is preferably, also included in the adhesive to provide adhesion and to enhance peel strength.

The adhesive further may include ferritic magnetic particles which can provide the magnetic field that retains the rain hat flange in position on the flat surface portion of the cowling. In a more preferred embodiment, the adhesive further includes a multifunctional cross-linking monomer such as trimethylolpropane trimethacrylate or trimethylolpropane triacrylate to increase the cross-linking density of the adhesive. Additionally the adhesive has an expansion agent which produces expansion of the adhesive when it is melted in the automotive paint oven to provide a more uniform and reliable seal 58 of the bottom portion 52. Furthermore, the adhesive may include a blowing agent which is thermally activated. The blowing agent should be fully activated at 200° C. The adhesive should have a melt index that allows it to flow sufficiently during the sealing operation. A more detailed disclosure of the formulation and materials embodied in a preferred adhesive can be found in commonly-assigned U.S. Pat. No. 5,985,435, which is incorporated by reference herein. However, other suitable sealants can be utilized such as those commercially available from L & L Products of Romeo, Mich. Suitable formulated materials include L-4200, L-2100 and L-4141.

It is contemplated that the material forming the seal 58 of the present invention adheres to the interior portion 56 of the bottom portion 52 of the filter housing member 14, thereby structurally reinforcing and enhancing the strength and stiffness of the filter housing member 14 which is in contact with and follows the geometry and contours of an inner edge of the bottom portion 52 and an outer perimeter of the screen 16. Preferably, the bottom portion 52 further has a lower extended wall 40 extending vertically downwardly from the lower planar surface 24 that surrounds the bottom opening 54. As shown in FIGS. 2, 4b and 5b, the lower extended wall 40 only partially surrounds the bottom opening 54, however, in an alternative preferred embodiment (not shown), the lower extended wall 40 could completely surround the bottom opening 54. Preferably, the configuration of the bottom wall is complementary to the configuration of the receptacle 12 disposed within a structural member of an automobile and therefore, the lower extended wall's configuration corresponds to the receptacle 12 configuration.

Preferably, the wall engages a portion of the receptacle 12 to ensure a secure, and preferably a sealable fit between the filter housing member 14 and the receptacle 12.

It is contemplated that the filter housing member 14 would optionally also have an exterior perimeter portion 38 suitable for receiving an application of sealant or adhesive material so that the filter housing member 14 adheres and affixes to a selected portion of the receptacle 12. The exterior perimeter portion 38 of the bottom portion 52 may be further utilized with a sealant or adhesive disposed along the filter housing member 14 so that the filter housing member 14 adheres to the chosen structural member receptacle 12 and remains in a designated position. The filter housing member 14 may utilize a strip or a plurality of strips of sealing material or expandable structural material disposed on or along an outer peripheral surface of the filter housing, both of which are commercially available from L&L Products, Inc. of Romeo, Mich. Any gap between the bottom portion 52 of the filter housing assembly 10 and the receptacle 12 disposed within the vehicle is preferably sealed by the adhesive, after it has been cured.

Referring to FIGS. 3, 4a, 4b and 6a–6b, it is contemplated that the filter housing assembly further provides the filter housing cover 94 to function as a water deflector to channel and screen water around the filter housing assembly 10. The filter housing cover 94 provides a cover for the filter housing member 14 and provides a top planar surface 96, the top planar surface 96 having a flared opening 146, a deflector portion 134, and a ridge portion 112 disposed therein. The flared opening 146 has a vertical edge 98 that operates as a dam to prevent fluids from flowing into the flared opening 146. Preferably, the vertical edge 98 is rectangular in geometry having two long parallel edges, a first long parallel edge 100, and a second parallel edge 102 and two short parallel edges, a first parallel edge 104 and a second parallel edge 106 perpendicular to the two long parallel edges 100, 102; however, the vertical edge 98 may be any suitable geometry that operates to prevent unwanted fluids from flowing into the flared opening 146. Preferably, the flared opening 146 is centered between and is spaced inwardly from two opposing ends of the filter housing cover 94 to allow for even distribution of fluids across the top planar surface 96.

Figures 6A, 6B, 6C:
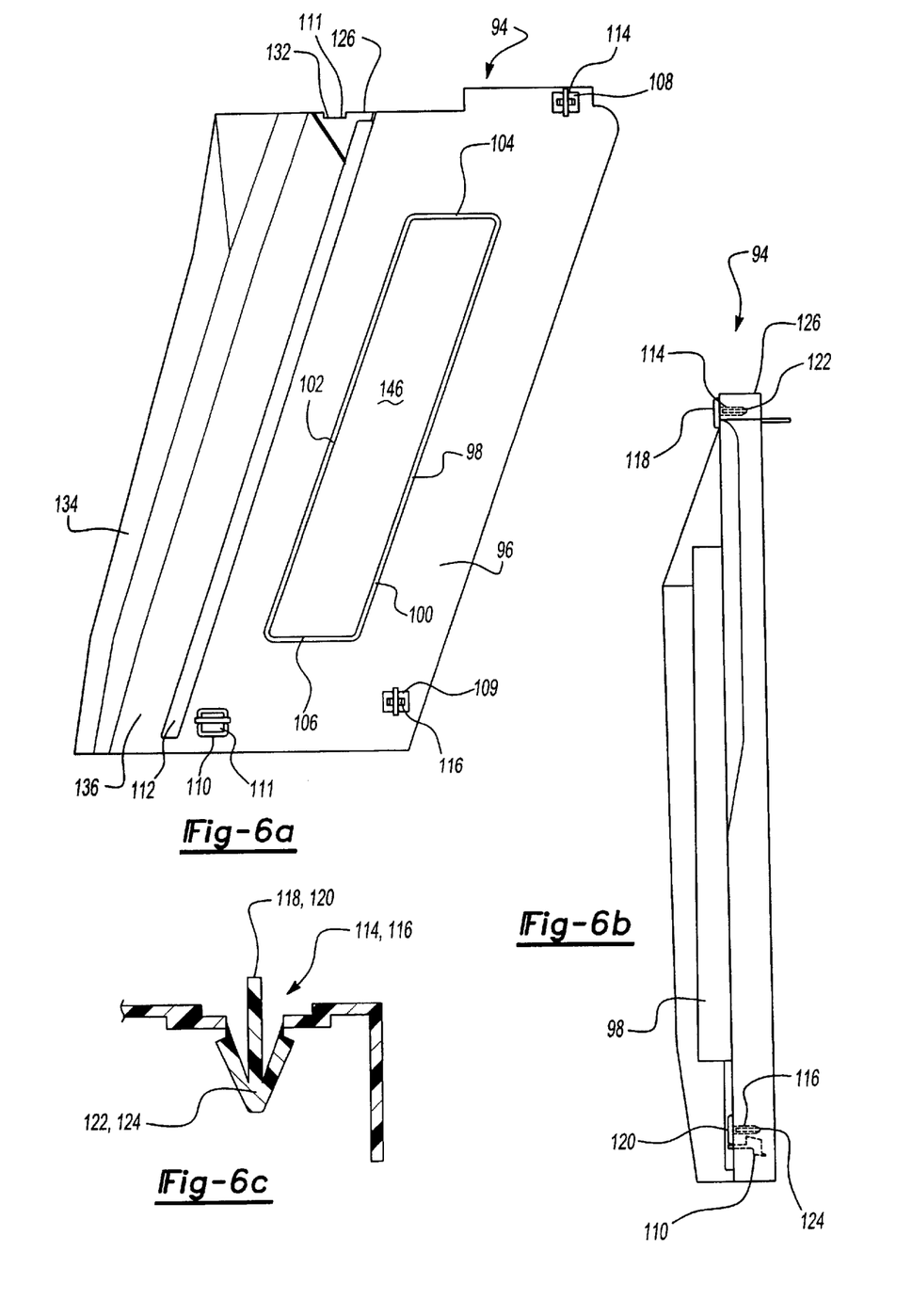

As shown in FIGS. 6a–c, the top planar surface 96 further provides at least two elongated fastener members, a first elongated fastener member 114, and a second elongated fastener member 116 integrally formed therewith and extending downward therefrom. The two elongated fastener members 114, 116 each have an upwardly protruding head, respectively, a first upwardly protruding head 118, and a second upwardly protruding head 120 with compliant barbs, respectively, a first compliant barb 122, and a second compliant barb 124. The compliant barbs 122, 124 of the fastener members 114, 116 are extended downwardly through an associated recess 108, 109 formed within the filter housing cover top planar surface 96. The compliant barbs 122, 124 engage the two holes 34, 36 formed within the two stops 26, 28 of the filter housing member 14 and thereafter retain the filter housing cover 94 in position with the filter housing member 14.

The top planar surface 96 further provides at least one compliant clip 110 or alternatively, a plurality of compliant clips (not shown) for releasably engaging the filter housing member L-shaped extended portion upper planar surface 62. As shown, the at least one compliant clip 110 is located near the ridge portion 112 of the filter housing cover 94, however, the at least one compliant clip 110 could be located in any suitable position that allows the filter housing cover 94 to releasably engage the filter housing cover 94 for easy access to the filter 18 disposed within the filter housing member 14. In operation, to release the L-shaped upper planar surface 62 from the compliant clip, the compliant clip is outwardly depressed and the filter housing cover 94 is lifted in an upward manner away from the filter housing member 14.

The filter housing cover 94 further provides a lower edge 126 having an interior surface 128, the lower edge 126 protrudes perpendicularly downwardly from the top planar surface 96 wherein the perimeter of the lower edge 126 is greater than the perimeter of the filter housing member upper peripheral wall 20 such that the interior surface 128 of the filter housing cover lower edge 126 abuts an outer edge 130, as shown in FIG. 4b, of the filter housing member 14 upper peripheral wall 20 when the filter housing cover 94 is snap-fit into engagement with the filter housing member 14. The lower edge 126 has a third recess 111 disposed therewithin, the recess 111 cooperates with the protruding portion 22 of the filter housing member upper peripheral wall 22 and a retaining member 132, disposed within the top planar surface 96 of the filter housing cover 94 to receive and releasably retain the protruding portion 22 of the filter housing member 14 upper peripheral wall 20 when the filter housing cover 94 and the filter housing member 14 are snap-fit together. To release the protruding portion 22 from the recess 111, the protruding portion 22 is depressed and the filter housing cover 94 is lifted upwardly away from the filter housing member protruding portion 22.

Additionally, the filter housing cover 94 provides the deflector portion 134 integrally formed with the top planar surface 96 and angularly extending upwardly and outwardly away from an outer peripheral edge of the top planar surface 96. The deflector portion 134 operates to control fluid flow by deflecting fluids engaging the deflector portion 134 downwardly towards the ridge portion 112.

The filter housing cover 94 further provides the ridge portion 112 and the deflector portion 134 to cooperate to define a channel 136 for directing fluid flow away from the flared opening 146. The ridge portion 112 extends vertically upwardly from the top planar surface 96 and preferably, is parallel to the long edges of the flared opening vertical edge 98. Optimally, the ridge portion 112 extends beyond the length of the long edges of the vertical edge 98 to deflect water away from the vertical edge 98. Also, preferably, the ridge portion 112 is spaced apart an equal distance between the deflector portion 134 and the flared opening vertical edge 98.

The above described embodiments of the filter housing assembly 10 merely illustrate the various forms in which the filter housing assembly 10 may take. One of ordinary skill in the art will appreciate that many other configurations and constructions of the filter housing assembly 10 may be used in practicing the invention. For example, the present invention also comprises a method of use of a filter housing assembly 10 having a removable filter 18 and snap-fit or modular engageable components.

In operation, the filter housing assembly 10 having a removable filter 18 is releasably snap fit together and is typically manually positioned to snap to a complementary shaped receptacle 12 member of an automobile vehicle such as a vehicle cowling. The filter housing assembly 10 is pushed downward allowing the clip 142 and protruding member 144 integrally formed with the screen 16 of the filter housing member bottom portion 52 to enter into snapping engagement with the receptacle 12 member. Additionally, the lower extended wall 40 is pressure fit within the receptacle 12 to further retain the filter housing assembly 10 within the receptacle 12.

The vehicle is then taken into an electrolyte bath, more commonly known as the e-coat operation. The increase in temperature caused by the paint ovens during and after the e-coat operation causes the optional strip or plurality of strips of sealing material or expandable structural material to activate or expand thereby adhesively and sealably connecting the filter housing assembly 10 to the receptacle 12. Thus, the filter housing assembly 10 is retained in position until the curing and expanding process of the adhesive is complete.

To replace a removable filter 18 disposed within the filter housing assembly 10, the filter housing cover 94 must be partially released from the filter housing member 14 by simultaneously releasing the L-shaped upper planar surface 62 from the compliant clip 110 and releasing the protruding portion 22 of the filter housing member 14 from the filter housing cover recess 108 and then lifting the filter housing cover 94 upwardly away from the filter housing member 14. The removable filter 18 may then be removed from the interior cavity 44, and replaced with a new filter.

While the present invention was illustrated and described with respect to a preferred embodiment, such description is exemplary only and not limiting in nature. Other aspects, objects, and advantages of this invention may be obtained from the study of the drawings, and the disclosure. It is well understood by those skilled in the art that various changes and modifications can be made in the invention without departing from the spirit and scope thereof, which is limited only by the appended claims.

What is claimed is:

1. A filter housing assembly for preventing foreign matter ingestion and inhibition of air flow into portions of an automotive vehicle, the assembly comprising:
   a filter housing member adapted to house a filter, the filter housing member having
      an upper peripheral wall,
      an intermediary portion, and
      a bottom portion, the bottom portion having a bottom opening, a screen, the screen being integrally formed within the bottom opening of the bottom portion therein, and an air filter;
   a filter housing cover having
      a top planar surface, the top planar surface having a flared opening disposed therewithin, a deflector portion, and a ridge portion, wherein the deflector portion and the ridge portion cooperate to deflect and channel water around the filter housing assembly; and wherein the filter housing member and the filter housing cover are adapted to releasably snap-fit together.

2. The assembly of claim 1 wherein the filter housing member upper peripheral wall further comprises:
   a first and a second stop member each disposed at an angle to the upper peripheral wall, the two stop members being spaced apart at opposite ends of the filter housing member;
   a lower interior planar peripheral edge disposed inwardly at an angle from the upper peripheral wall, the lower interior planar peripheral edge cooperates with the intermediary portion to define an inner perimeter shelf for supporting the air filter; and
   a protruding portion that protrudes outwardly from an exterior portion of the peripheral wall for releasably engaging the filter housing cover.

3. The assembly of claim 2 wherein each of the two stop members has an associated hole disposed therewithin for receiving a fastener member.

4. The assembly of claim 2 wherein the filter housing member further comprises:
   an end shelf having a side wall,
   a flat planar surface for engaging an air filter flange member to properly seat the air filter within the filter housing member,
   an L-shaped extended portion extending outwardly from the flat planar surface of the end shelf, the L-shaped extended portion having an upper planar surface that is co-planar with the second stop member of the peripheral wall for releasably snap-fitting to a compliant clip disposed within and protruding downwardly from the upper planar surface of the filter housing cover, wherein the end shelf is spaced a distance above the inner perimeter shelf a distance equal to or greater than a thickness of the air filter such that the lower interior planar peripheral edge and the side wall cooperate to define an interior cavity for securing the air filter within the filter housing member.

5. The assembly of claim 1, wherein the air filter is removably attached to the filter housing assembly and is capable of preventing carbon monoxide and unwanted odors from entering an interior area of an automotive vehicle.

6. The assembly of claim 1, wherein the air filter is permanently attached to the filter housing assembly and is capable of preventing carbon monoxide and unwanted odors from entering an interior area of an automotive vehicle.

7. The assembly of claim 1, wherein the air filter has a foam rubber gasket adhesively joined to the air filter.

8. The assembly of claim 1, wherein the filter housing member intermediary portion is angled and extends downwardly away from the upper peripheral wall.

9. The assembly of claim 1, wherein the bottom portion of the filter housing member further comprises:
   a lower planar surface surrounding the bottom opening, the lower planar surface being integrally formed with the intermediary portion and spaced below the inner perimeter shelf,
   an interior portion for sealably attaching to the screen disposed within the bottom opening, wherein the screen is integrally disposed within the bottom opening of the lower planar surface, wherein the bottom opening is in fluid communication with an air inlet of an automotive vehicle for providing an ingress for air to flow within portions of the vehicle;
   a lower extended wall extending vertically downwardly from the lower planar surface;
   at least one clip; and
   a downwardly protruding member, wherein the at least one clip and the downwardly protruding member are integrally formed with the screen and are adapted to attach the filter housing member to a receptacle in an automotive vehicle.

10. The assembly of claim 9, wherein the bottom portion further comprises a seal that surrounds the bottom opening and a perimeter of the screen, wherein the seal adheres to the interior portion of the filter housing member bottom portion to structurally reinforce and enhance the strength and stiffness of the filter housing member.

11. The assembly of claim 1, wherein the screen is formed within the bottom opening by stamping the screen to the filter housing bottom portion.

12. The assembly of claim 1, wherein the filter housing member further comprises:
   an exterior perimeter portion suitable for receiving an application selected from the group consisting of sealant, adhesive material, and expandable structural material so that the filter housing member adheres and affixes to a selected portion of a receptacle in an automotive vehicle.

13. The assembly of claim 12, wherein the material applied to the exterior perimeter portion is formed in a strip or a plurality of strips.

14. The assembly of claim 1, wherein the top planar surface comprises:
   at least two elongated fastener members, the two elongated fastener members each have an associated upwardly protruding head, each upwardly protruding head has an associated compliant barb, wherein the associated compliant barbs are extended downwardly through a recess formed within the top planar surface for engaging the filter housing member;
   a lower edge having an interior surface protruding perpendicularly downwardly from the top planar surface wherein the perimeter of the lower edge is greater than the perimeter of the filter housing member upper peripheral wall such that the interior surface of the filter housing cover lower edge abuts an outer edge of the filter housing member upper peripheral wall when the filter housing cover is snap-fit into engagement with the filter housing member; and
   a vertical edge integrally formed with the flared opening, the vertical edge operates as a dam to prevent fluids from flowing into the flared opening.

15. The assembly of claim 14, wherein the vertical edge is rectangular having two long parallel edges and two short parallel edges.

16. The assembly of claim 15, wherein the ridge portion extends vertically upwardly from the top planar surface and is parallel to and extends beyond the long edges of the flared opening vertical wall.

17. The assembly of claim 1, wherein the deflector portion is integrally formed with the top planar surface and angularly extends upwardly and outwardly away from an outer peripheral edge of the top planar surface.

18. A filter housing assembly for preventing foreign matter ingestion and inhibition of air flow into portions of an automotive vehicle, the assembly comprising:

a filter housing member adapted to house a filter, the filter housing member having an upper peripheral wall, the upper peripheral wall having two stop members disposed at an angle to the upper peripheral wall, the two stop member being spaced at two opposite ends of the filter housing member, and a lower interior planar peripheral edge disposed inwardly at an angle from the upper peripheral wall, the lower interior planar peripheral edge defining an inner perimeter shelf for supporting the air filter, an intermediary portion angled and extending downwardly away from the upper peripheral wall, a bottom portion having:
  a screen integrally disposed within the bottom portion,
  a removable air filter,
  a bottom opening, the bottom opening having an interior portion for sealably attaching to the screen,
  a lower planar surface, the lower planar surface being integrally formed with the intermediary portion and being spaced below the inner perimeter shelf, wherein the bottom opening is disposed within the lower planar surface, and
  a lower extended wall extending vertically downwardly from the lower planar surface and surrounding the bottom opening;

a filter housing cover having a top planar surface, the top planar surface having a flared opening disposed therewithin, a deflector portion, and a ridge portion, wherein the reflector portion and the ridge portion cooperate to deflect and channel water around the filter housing assembly, wherein the filter housing member and the filter housing cover are adapted to releasably snap-fit together;

means for attaching the assembly to a receptacle member of an automotive vehicle; and means for releasably attaching the filter housing member to the filter housing cover.

19. The assembly of claim 18 wherein the lower extended wall partially surrounds the bottom opening.

20. The assembly of claim 18 wherein the lower extended wall completely surrounds the bottom opening.

21. A method of using a filter housing assembly for preventing foreign matter ingestion and inhibition of air flow into portions of an automotive vehicle, comprising the steps of:

providing a releasable snap-fit together filter housing assembly, the filter housing assembly having a filter housing member and a filter housing cover;

disposing a removable air filter within the filter housing assembly, the removable air filter being capable of filtering carbon monoxide and odors;

positioning the filter housing assembly within an automotive vehicle by clipping the assembly to a complementary shaped receptacle member of an automotive vehicle; and replacing the removable air filter disposed within the filter housing assembly by releasing associated compliant clips attached to the filter housing member and the filter housing cover with a replacement removable filter when the removable filter is blocked by foreign matter.

* * * * *